INVENTOR
WILLIAM R. UTTAL

BY Geoffrey Knight
ATTORNEY

Oct. 22, 1963

W. R. UTTAL 3,108,268

COMMUNICATOR

Filed Dec. 30, 1959

2 Sheets-Sheet 2

INVENTOR
WILLIAM R. UTTAL

BY Geoffrey Knight
ATTORNEY

United States Patent Office 3,108,268

Patented Oct. 22, 1963

3,108,268

COMMUNICATOR

William R. Uttal, Yorktown Heights, N.Y., assignor to International Business Machines Corporation, New York, N.Y., a corporation of New York Filed Dec. 30, 1959, Ser. No. 862,894

1 Claim. (Cl. 340—407)

This invention relates to apparatus for communicating with a human. More particularly, coded electrical pulses are used to transfer information to a human by means of electrodes in cutaneous contact with a limb.

Instrumentation of aircraft has become so complex that the pilot's eyes and ears are constantly occupied, monitoring essential information. He must watch numerous dials, and listen for various alarms. Also, he must be in radio communication with the ground. Further instrumentation is limited by the capacity of the pilot's senses of sight and hearing.

The invention described in this application utilizes another sense of the pilot's thus increasing his communication capacity. Obviously, this principle is equally applicable to any person who must monitor instruments, or who must be communicated with, for example: a person who has lost his sense of sight or hearing. Further, this invention makes it possible to communicate with properly trained animals.

Accordingly, among the objects of my invention are:

(1) To provide means for communicating with a human by coded cutaneous stimulation.

(2) To employ means mounted in cutaneous contact with a limb of a human for transferring information to the human.

(3) To stimulate the cutaneous neural network of a human with coded pulses, in a manner such that the separate pulses are distinguishable by the human.

(4) To communicate with a human by passing coded pulses through the cutaneous neural network from each of a group of electrodes, in contact with a limb, to an additional electrode in contact elsewhere with the human.

The invention described in this application achieves the above objects by means of apparatus which selectively stimulates differentiable afferent neurons of the cutaneous neural network. A number of electrodes are placed in cutaneous contact around a limb of the person to be communicated with. An electrical circuit is completed through the cutaneous neural network by provision of an additional electrode placed in cutaneous contact at some other point on the person. Selective pulsing of the electrodes stimulates different combinations of afferent neurons. The person may be trained to associate each combination with some particular information.

It is essential that the electrodes be so spaced about the chosen limb that the brain of the wearer will be able to differentiate between activated electrodes and unactivated ones. Further, certain areas of the limbs are so sensitive to stimulation that it is desirable to avoid them altogether, otherwise masking of one pulse, by another pulse, will occur.

The foregoing and other objects, features and advantages of the invention will be apparent from the following more particular description of a preferred embodiment of the invention, as illustrated in the accompanying drawings.

Figures 1, 2, 3, 4:
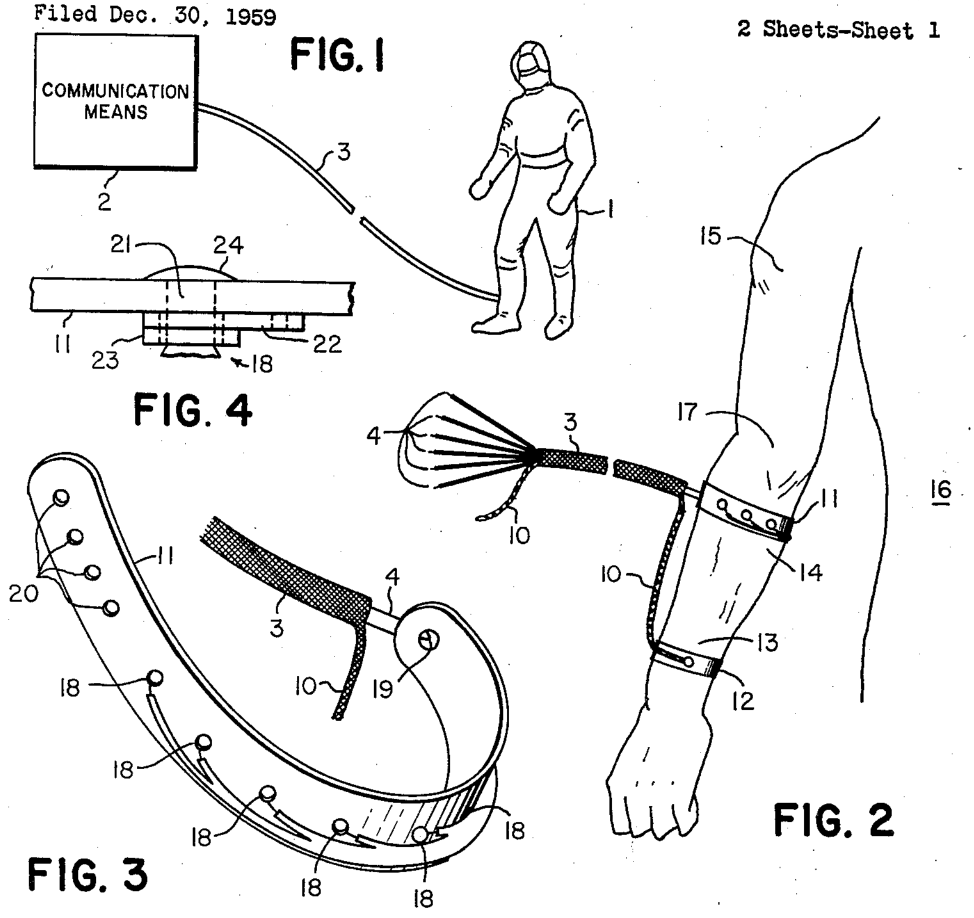
FIG. 1 is a picture of a human, schematically showing his connection to the external communication means shown in more detail in FIGS. 7 and 8.
FIG. 2 is a picture showing the placing of electrodes on an arm, as an example of one application of the invention.
FIG. 3 is a picture of a band adapted to hold electrodes.
FIG. 4 is a fragmentary view of a portion of the band, and one of the electrodes, shown in FIG. 3.

Referring to FIG. 1, there is shown a human wearing a pressure suit 1. Communication means 2 connect to the human via cable 3. Thus information may be communicated to the human from some convenient source such as a typewriter, card reader, computer, radio receiver, etc.

As shown in FIG. 2, the cable 3 is composed of insulated conductors 4, and a braid 10. The exact number of conductors 4 used is arbitrary, depending upon the quantity of information that must be transferred from the communication means 2. As an illustration, cable 3 is shown as made up of six insulated conductors 4, surrounded by a conductive braid 10.

Each of the insulated conductors 4 is connected to an electrode on the band 11. The braid 10 is connected to the band 12. The bands 11 and 12 are shown surrounding the top forearm 14 and wrist 13 respectively, of the left upper limb 15 of a man 16. The limb 15 is chosen only as an example. The band 11 may be placed around any other limb of the man 16, or about his neck. However, extremely sensitive spots, such as the wrist 12 and just above the elbow 17, are best avoided, to prevent masking, (later discussed). The contact made by band 12 may be made anywhere on the body, without a band, the placing of the band 12 on the wrist 13 being a convenient example.

Referring now to FIGS. 3 and 4, the placing of six electrodes 18 on the band 11 is shown. The number of electrodes 18 is chosen to correspond to the number of conductors 4, so that each conductor 4 may connect to one electrode 18. The electrodes 18 are spaced on the band 11 so that when it is fastened around a limb by placing the hook 19 in one of the holes 20, they will be symetrically spaced about the limb. The band 11 is made of a non-conducting material. Each electrode may consist of a $\frac{3}{16}$ inch rivet 21 holding terminal 22 between the band 11 and washer 23. The head 24 of each rivet 21 is the surface to be placed in contact with the chosen limb.

Figure 5:
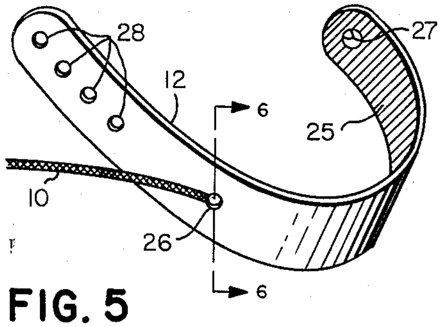
FIG. 5 is a picture of a band adapted to act as a single electrode.
Figure 6:
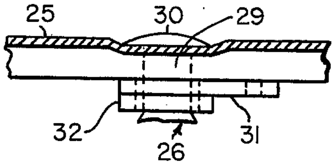
FIG. 6 is a cross section through the band, on this line 6—6 of FIG. 5.

As shown in FIGS. 5 and 6, the band 12 may be constructed in a manner similar to band 11, with the addition of a conductive layer 25, which is the surface to be placed in contact with the chosen limb. Conductive layer 25 is electrically connected with the braid 10 through electrode 26. Electrode 26 can be conveniently constructed from a $\frac{3}{16}$ inch rivet 29 having a flattened head in contact with the layer 25. The rivet 29 holds terminal 31 between the band 12 and the washer 32. The band 12 is fastened around a limb by placing hook 27 in one of the holes 28. Note that it is only necessary that cutaneous contact be made with braid 10, anywhere on the body. The band 12 is not essential to the invention.

Figure 7:
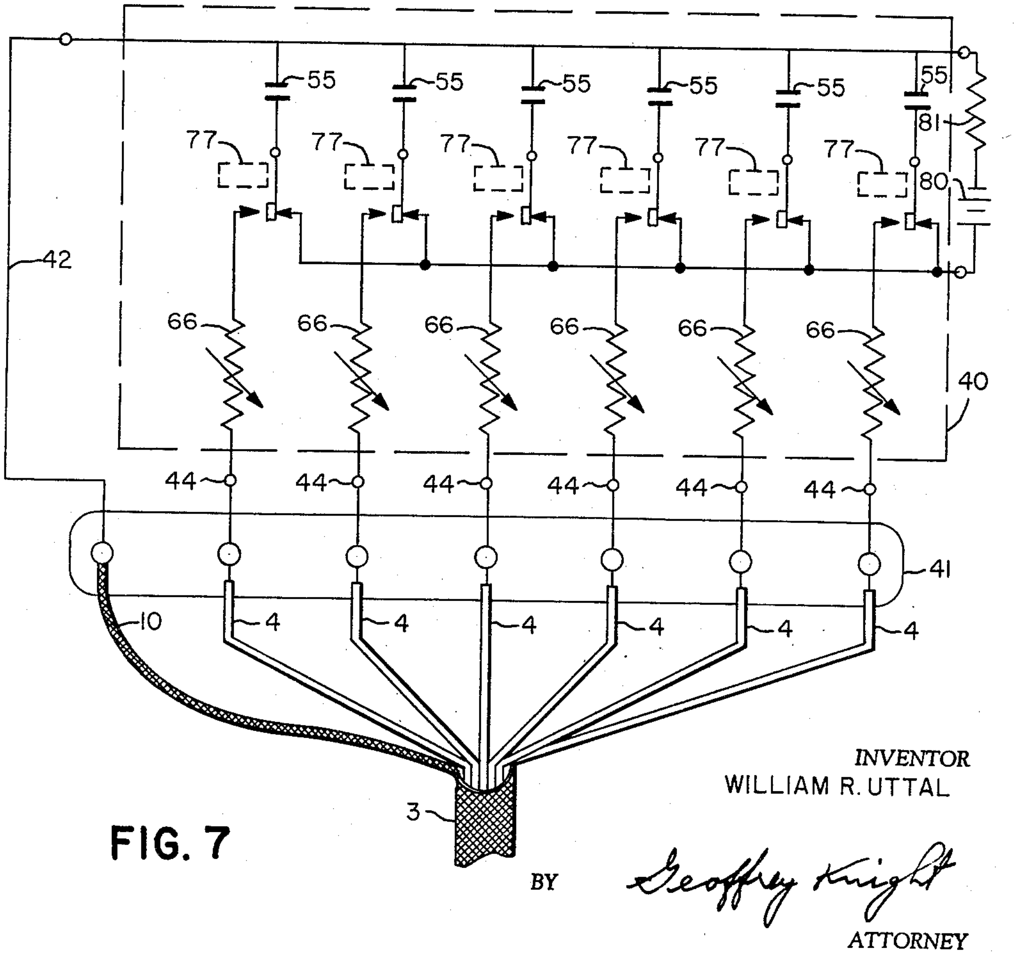
FIG. 7 is a circuit diagram of a pulse source usable with one embodiment of the invention.

The circuit 40 shown in FIG. 7 is one example of an apparatus that may be used to generate pulses of an amplitude and duration adequate to properly stimulate the afferent neurons associated with electrode 18, when the band 11 is placed around the arm 15 of the man 16. This pulse generation circuit 40 is equally usable with other means for stimulating the cutaneous neural network of a human.

The insulated conductors 4, and the braid 10, of the cable 3 terminate at terminal board 41. At terminal board 41, braid 10 is connected to common return wire 42, and the six conductors 4 are connected to the pulse circuit 40 outputs 44. The pulse circuit 40 comprises six capacitors 55, six variable resistors 66 and six SPDT relays 77. Additional outputs 44 may be obtained by adding one capacitor 55, one resistor 66 and one relay 77 for each extra output 44.

In the normal un-picked condition, the relays 77 complete a charging circuit from each capacitor 55 to the potential source 80, through the arc suppressing resistor 81. When a relay 77 is picked, its associated capacitor 55 is disconnected from the potential source 80, and is connected to a variable resistor 66. Therefore, when a relay 77 is picked, a pulse of potential appears between the common return 42 and the associated output 44. If the relays 77 are picked in accordance with a predetermined code, then the pulses appearing at the outputs 44 will conform to the code.

Masking is avoided by adjustment of the variable resistors 66. The phenomenon known as masking occurs when one pulse stimulates the cutaneous neural network in such a manner that other simultaneous pulses are indistinguishable by the human. Assuming that the electrodes are adequately spaced, and that they are not placed in an overly sensitive area, then attenuation of the pulse causing the masking will alleviate the problem. Attenuation of a pulse is accomplished by increasing the value of the associated resistor 66; then, a smaller proportion of the potential across a capacitor 55 will appear between the associated output 44 and common return 42. This is explained by the voltage divider, formed by a resistor 66 and the human, across which a relay 77 connects a capacitor 55.

Figure 8:
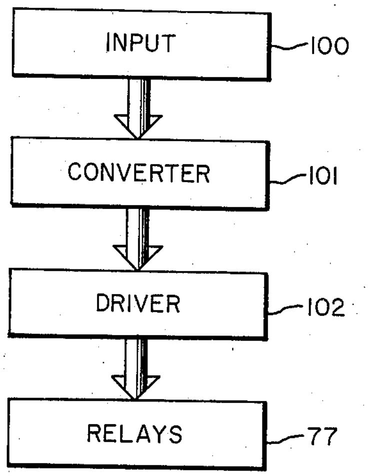
FIG. 8 is a diagram of apparatus usable to operate the pulse source shown in FIG. 7.

The operation of the invention will now be described. Referring to FIG. 8, there is shown, in block diagram form, an input device 100 of any convenient type. The input device 100 may be an electric typewriter, etc. or merely punched cards. Depending upon the type of input device 100 used some means of translation must be supplied to convert the signals from the input device 100 code to the preselected code which will be utilized. The converter 101 serves to translate the input device 100 code to a desired code. For example, if the input device 100 is a paper tape reader, information may be stored as holes arranged in telegraphic code. The converter 101, will have the function of translating the holes into electrical impulses conforming to some code (such as the binary code) that the human being communicated to, has learned to recognize.

The IBM Type 043 Tape Unit is one example of the input device 100. One function of this unit is to sense the tape holes and to pick relays selected to correspond to the holes sensed. Therefore, if this unit is used, the converter 101 and driver 102 and relays 77 are all provided for.

The output of the converter 101 picks the proper relays 77 by activating relay driver 102 in accordance with the preselected code. The relay driver 102 is usually a battery. Coded pulses symbolic of the information to be communicated thus appear at the electrodes 18 in FIG. 3. It has been found that pulses having a duration of from one to five milliseconds and an amplitude of about 150 volts, function well in an arrangement of the type shown in FIG. 2. Cutaneous sensitivity may be increased by lightly sanding the skin under each electrode 18 with emery paper, and then rubbing it with electrode jelly.

While the invention has been particularly shown and described with reference to a preferred embodiment thereof, it will be understood by those skilled in the art that various changes in form and details may be made therein without departing from the spirit and scope of the invention.

I claim:

Apparatus for communication with a human by binary pulse coded cutaneous stimulation comprising: a plurality of electrodes, for cutaneous contact; non-conducting attachment means for positioning said electrodes in cutaneous contact along a circumference of a limb so as to provide individual channels for selective stimulation of cerebrally differentiable afferent neurons of the cutaneous neural network; a plurality of sources of stimulations operable in combinations according to a preselected binary code, each source having an output, and all of the sources having a common return; means for connecting each of the electrodes to a different one of the sources; conductive means for cutaneous contact with the human along a circumference of the limb at a distance along the length of the limb from the non-conducting attachment means; and means for connecting said conductive means to said common return.

References Cited in the file of this patent

UNITED STATES PATENTS

| | | |
|---|---|---|
| 1,881,878 | Nidy | Oct. 11, 1932 |
| 2,477,084 | Rehman | July 26, 1949 |
| 2,703,344 | Anderson | Mar. 1, 1955 |

OTHER REFERENCES

Geldard (2): Hearing Through the Skin, reprinted from Research Reviews, October 1954, by Office of Naval Research, pp. 15–20.

Geldard (1): The Utilization of Cutaneous Reception for Communications, Office of Naval Research Symposium Report ACR–1, March, 1955, pp. 44–47.